(12) United States Patent
Jian (10) Patent No.: US 12,172,479 B1
(45) Date of Patent: Dec. 24, 2024

(54) ADJUSTABLE TRAILER COUPLER

(71) Applicant: Yanwei Jian, Wuchuan (CN)

(72) Inventor: Yanwei Jian, Wuchuan (CN)

( * ) Notice: Subject to any disclaimer, the term of this patent is extended or adjusted under 35 U.S.C. 154(b) by 0 days.

(21) Appl. No.: 18/759,945

(22) Filed: Jun. 30, 2024

(51) Int. Cl.
| | | |
|---|---|---|
| *B60D 1/46* | (2006.01) | |
| *B60D 1/42* | (2006.01) | |
| *B60D 1/48* | (2006.01) | |
| *B60D 1/52* | (2006.01) | |

(52) U.S. Cl.
CPC ............... *B60D 1/46* (2013.01); *B60D 1/42* (2013.01); *B60D 1/48* (2013.01); *B60D 1/52* (2013.01)

(58) Field of Classification Search
CPC ... B60D 1/46; B60D 1/42; B60D 1/48; B60D 1/52
See application file for complete search history.

(56) References Cited

U.S. PATENT DOCUMENTS

| | | | | |
|---|---|---|---|---|
| 9,457,631 | B1* | 10/2016 | Kennemer ............... | B60D 1/52 |
| 2021/0237524 | A1* | 8/2021 | Singh ..................... | B60D 1/46 |
| 2023/0294467 | A1* | 9/2023 | Good ...................... | B60D 1/06 |
| | | | | 280/504 |

* cited by examiner

*Primary Examiner* — Kevin Hurley
*Assistant Examiner* — Marlon A Arce (57) ABSTRACT

The present disclosure provides an adjustable trailer coupler, including: a fixing base provided with a plurality of positioning portions; a connecting base, which is arranged on the fixing base, is movable in a height direction of the fixing base, and is provided with a first connecting hole and a locking slot, the locking slot being located in a hole wall of the first connecting hole; a locking structure arranged on the connecting base in a transversely movable manner, the locking structure having a locked state in which the locking structure fits into any one of the positioning portions and an unlocked state in which the locking structure is disengaged from the positioning portion; an unlocking structure movably arranged on the connecting base and connected to the locking structure, the unlocking structure being forced to move to switch the locking structure between the locked state and the unlocked state; a connector inserted into the first connecting hole; and an elastic latching structure arranged on the connector and provided with a first locking portion, the first locking portion fitting into the locking slot, and the first locking portion having an avoidance state of retracting into the connector and an extension state of extending out of the connector. The adjustable trailer coupler enables reduced mounting difficulty.

20 Claims, 4 Drawing Sheets

ADJUSTABLE TRAILER COUPLER

TECHNICAL FIELD

The present disclosure relates to a trailer coupler, and in particular to an adjustable trailer coupler.

BACKGROUND ART

A ball-end trailer coupler, as one of trailer couplers, is used for connecting a tractor to a towed device so that the towed device can move with the tractor.

The ball-end trailer coupler mainly includes a fixing base, a connecting base and a connector. The fixing base is fixedly connected to the tractor. The connecting base is arranged on the fixing base. The connector is arranged on the connecting base. The connector is connected to the towed device by means of a ball cover connecting arm, thereby connecting the towed device and the tractor together.

At present, in order to adapt to vehicles of different heights, the ball-end trailer coupler on the market has a connecting base that can slide up and down on the fixing base. However, since the connector is connected to the connecting base and the connecting base is connected to the fixing base by the same connecting shaft, during mounting, it is necessary to pass one end of the connecting shaft through the connecting base and the connector, and the other end of the connecting shaft through an adjustment hole in the fixing base, resulting in high mounting difficulty and low mounting efficiency.

SUMMARY OF THE INVENTION

An embodiment of the present disclosure provides an adjustable trailer coupler to solve the problems existing in the related art. The technical solution is as follows.

An embodiment of the present disclosure provides an adjustable trailer coupler, including:

- a fixing base, the fixing base being configured for connection to a tractor, the fixing base being provided with a plurality of positioning portions, and the plurality of positioning portions being arranged in sequence in a height direction of the fixing base;
- a connecting base, the connecting base being arranged on the fixing base, the connecting base being movable in the height direction of the fixing base, the connecting base being provided with a first connecting hole and a locking slot, the first connecting hole running through the connecting base, and the locking slot being located in a hole wall of the first connecting hole;
- a locking structure, the locking structure being arranged on the connecting base in a transversely movable manner, and the locking structure having a locked state in which the locking structure fits into any one of the positioning portions to limit the movement of the connecting base in the height direction of the fixing base and an unlocked state in which the locking structure is disengaged from the positioning portion to enable the movement of the connecting base in the height direction of the fixing base;
- an unlocking structure, the unlocking structure being movably arranged on the connecting base, the unlocking structure being connected to the locking structure, and the unlocking structure being forced to move to switch the locking structure between the locked state and the unlocked state;
- a connector, the connector being inserted into the first connecting hole, and the connector being configured for connection to a ball cover connecting arm of a towed device; and
- an elastic latching structure, the elastic latching structure being arranged on the connector, the elastic latching structure being provided with a first locking portion, the first locking portion fitting into the locking slot to limit disengagement of the connector from the first connecting hole, the first locking portion having an avoidance state of retracting into the connector to enable the movement of the connector along the first connecting hole and an extension state of extending out of the connector, and the first locking portion being reset from the avoidance state to the extension state under an elastic force of the elastic latching structure.

The above description is merely presented for the purpose of the specification, and is not intended to limit the present disclosure in any way. In addition to the above illustrative aspects, implementations and features, further aspects, implementations and features of the present disclosure will become readily apparent with reference to the accompanying drawings and the following detailed description.

BRIEF DESCRIPTION OF THE DRAWINGS

In figures, the same reference signs denote the same or similar components or elements throughout multiple figures unless otherwise specified. These figures are not necessarily drawn to scale. It should be understood that these figures depict only some implementations disclosed according to the present disclosure and are not to be construed as limiting the scope of the present disclosure.

LIST OF REFERENCE SIGNS

1. Fixing base; 11. Positioning portion; 111. Positioning slot; 12. Guide portion; 2. Connecting base; 21. First connecting hole; 22. Locking slot; 23. Guide hole; 24. Mounting hole; 25. Second connecting hole; 26. Guide slot; 3. Locking structure; 31. Locking shaft; 311. Second locking portion; 312. Connecting slot; 313. Linkage slot; 32. First elastic member; 321. First spring; 4. Unlocking structure; 41. Lock cylinder; 411. Insertion hole; 42. Linkage portion; 5. Connector; 51. Third connecting hole; 52. Ball end; 6. Elastic latching structure; 61. First locking portion; 62. Second elastic member; 621. Second spring; 7. Lock housing; 8. Fastener.

DETAILED DESCRIPTION OF EMBODIMENTS

Only some exemplary embodiments will be briefly described below. As can be appreciated by those skilled in the art, modifications may be made to the described embodiments in various ways without departing from the spirit or scope of the present disclosure. Therefore, the drawings and the description are considered as exemplary in nature rather than limiting.

FIGS. 1-4 illustrate an adjustable trailer coupler according to a preferred implementation of the present invention. The adjustable trailer coupler includes:

a fixing base 1, the fixing base 1 being configured for connection to a tractor, the fixing base 1 being provided with a plurality of positioning portions 11, and the plurality of positioning portions 11 being arranged in sequence in a height direction of the fixing base 1;

a connecting base 2, the connecting base 2 being arranged on the fixing base 1, the connecting base 2 being movable in the height direction of the fixing base 1 so that the height position of the connecting base 2 on the fixing base 1 is adjustable, the connecting base 2 being provided with a first connecting hole 21 and a locking slot 22, the first connecting hole 21 running through the connecting base 2, and the locking slot 22 being located in a hole wall of the first connecting hole 21;

a locking structure 3, the locking structure 3 being arranged on the connecting base 2 in a transversely movable manner, and the locking structure 3 having a locked state in which the locking structure fits into any one of the positioning portions 11 to limit the movement of the connecting base 2 in the height direction of the fixing base 1 and an unlocked state in which the locking structure is disengaged from the positioning portion 11 to enable the movement of the connecting base 2 in the height direction of the fixing base 1;

an unlocking structure 4, the unlocking structure 4 being movably arranged on the connecting base 2, the unlocking structure 4 being connected to the locking structure 3, and the unlocking structure 4 being forced to move to switch the locking structure 3 between the locked state and the unlocked state;

a connector 5, the connector 5 being inserted into the first connecting hole 21, and the connector 5 being configured for connection to a ball cover connecting arm of a towed device; and an elastic latching structure 6, the elastic latching structure 6 being arranged on the connector 5, the elastic latching structure 6 being provided with a first locking portion 61, the first locking portion 61 fitting into the locking slot 22 to limit disengagement of the connector 5 from the first connecting hole 21, in order to fixedly connect the connector 5 and the connecting base 2 together, the first locking portion 61 having an avoidance state of retracting into the connector 5 to enable the movement of the connector 5 along the first connecting hole 21 and an extension state of extending out of the connector 5, and the first locking portion 61 being reset from the avoidance state to the extension state under an elastic force of the elastic latching structure 6.

The adjustable trailer coupler according to the present invention includes the fixing base 1, the connecting base 2, the locking structure 3, the unlocking structure 4, the connector 5 and the elastic latching structure 6, wherein the fixing base 1 is provided with the plurality of positioning portions 11 arranged in sequence in the height direction of the fixing base; the connecting base 2 is movable in the height direction of the fixing base 1 so that the height position of the connecting base 2 on the fixing base 1 is adjustable; the locking structure 3 is arranged on the connecting base 2 in a transversely movable manner, the locking structure 3 has the locked state in which the locking structure fits into any one of the positioning portions 11 to limit the movement of the connecting base 2 in the height direction of the fixing base 1, in order to reliably fix the connecting base 2 and the fixing base 1 together, and the locking structure 3 also has the unlocked state in which the locking structure is disengaged from the positioning portion 11 to enable the movement of the connecting base 2 in the height direction of the fixing base 1, so that the height position of the connecting base 2 can be adjusted; and the unlocking structure 4 is movably arranged on the connecting base 2, the unlocking structure 4 is connected to the locking structure 3 to limit disengagement of the locking structure 3 from the connecting base 2, and the unlocking structure 4 moves to switch the locking structure 3 between the locked state and the unlocked state. Therefore, when a force is applied to the unlocking structure 4 in a forward direction, the unlocking structure 4 moves in the forward direction to drive the locking structure 3 to move transversely, so that the locking structure 3 fits into the corresponding positioning portion 11 to fixedly connect the connecting base 2 and the fixing base 1 together, stably maintaining the connecting base 2 at a desired height; and when a force is applied to the unlocking structure 4 in a reverse direction, the unlocking structure 4 moves in the reverse direction to drive the locking structure 3 to move transversely, so that the locking structure 3 is disengaged from the corresponding positioning portion 11 to disconnect the connecting base 2 from the fixing base 1, and the connecting base 2 can move in the height direction of the fixing base 1, realizing adjustment of the height position of the connecting base 2.

In addition, the connector 5 is inserted into the first connecting hole 21, the elastic latching structure 6 is arranged on the connector 5, the elastic latching structure 6 is provided with the first locking portion 61, and the first locking portion 61 fits into the locking slot 22 to limit disengagement of the connector 5 from the first connecting hole 21, in order to reliably and fixedly connect the connector 5 and the connecting base 2 together, so that the connector 5 is stably maintained at the desired height as the connecting base 2 is fixed to the fixing base 1, and the height position of the connector 5 can be adjusted as the connecting base 2 is adjusted. Height adjustment can be performed according to different requirements of the towed device to match the desired height of the towed device, so that the towed device can be more easily and conveniently hitched and the ball cover connecting arm is latched, so as to carry out a safer towing behavior.

In addition, the first locking portion 61 has the avoidance state of retracting into the connector 5 to enable the movement of the connector 5 along the first connecting hole 21 and the extension state of extending out of the connector 5, and the first locking portion 61 is reset from the avoidance state to the extension state under the elastic force of the elastic latching structure 6. Therefore, when the connector 5 is mounted, the first locking portion 61 is pressed to retract into the connector 5, the connector 5 is then inserted into the first connecting hole 21, and the first locking portion 61 is released when aligned with the locking slot 22, so that the first locking portion 61 can automatically extend out of the connector 5 under the elastic force of the elastic latching structure 6 to fit into the locking slot 22, enabling reliable fixation of the connector 5 to the connecting base 2, and achieving high structural reliability.

In addition, since the connecting base 2 is connected to the fixing base 1 by means of the locking structure 3, during mounting, the locking structure 3 only needs to be mounted on the connecting base 2 and connected to the fixing base 1, so that the mounting operation is simple and convenient, the mounting difficulty is low, and the mounting efficiency can be improved. Moreover, the connector 5 and the connecting base 2 are connected by means of the elastic latching structure 6. During mounting, the first locking portion 61 is pressed to retract into the connector 5, the connector 5 is then inserted into the first connecting hole 21, and the first locking portion 61 is released when aligned with the locking slot 22, so that the first locking portion 61 can automatically extend out of the connector 5 under the elastic force of the elastic latching structure 6 to fit into the locking slot 22. Therefore, the mounting operation is simple and convenient, the mounting difficulty is low, and the mounting efficiency can be greatly improved.

In addition, when the height position of the connector 5 needs to be adjusted, it is only necessary to drive the locking structure 3 by means of the unlocking structure 4 to move on the connecting base 2. Compared with the prior art in which it is necessary to drive the connecting shaft that connects the fixing base 1, the connecting base 2 and the connector 5, the area of contact between the locking structure 3 and the connecting base 2 is smaller, so that the friction resistance can be reduced to make the movement of the locking structure 3 smoother, and the ease of adjustment can be improved.

Referring to FIGS. 1-4, in an implementation, the positioning portion 11 includes a positioning slot 111, the positioning slot 111 being in inserting fit with the locking structure 3. The large area of contact between the positioning portion 11 of a slot structure and the locking structure 3 can greatly enhance the stability of connection between the positioning portion 11 and the locking structure 3, so that the stability of connection between the fixing base 1 and the connecting base 2 can be enhanced, achieving higher structural reliability.

In other implementations, the positioning portion 11 may include a positioning bulge abutting against the locking structure 3. In this way, it is also possible to enable the connection between the connecting base 2 and the fixing base 1.

Figure 1:
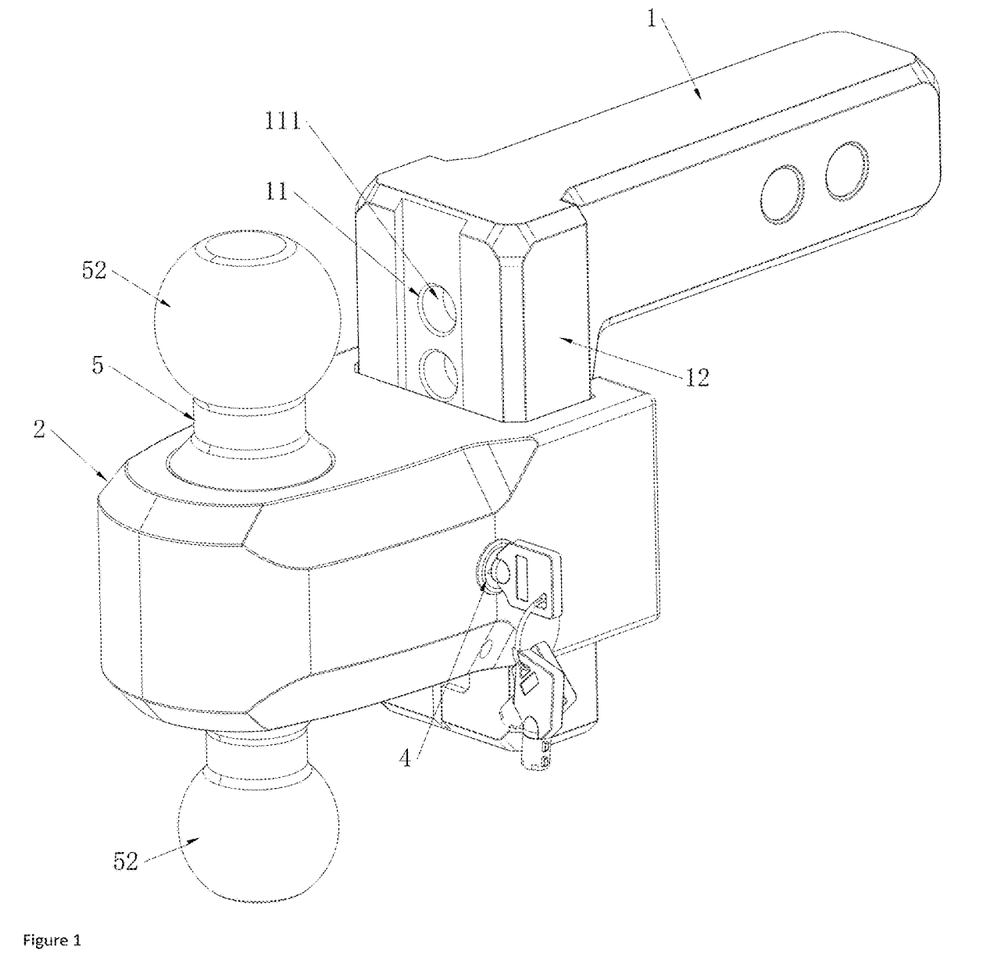
FIG. 1 is a schematic diagram of a spatial structure of an adjustable ball-type trailer coupler according to the present invention from a first perspective.
Figure 2:
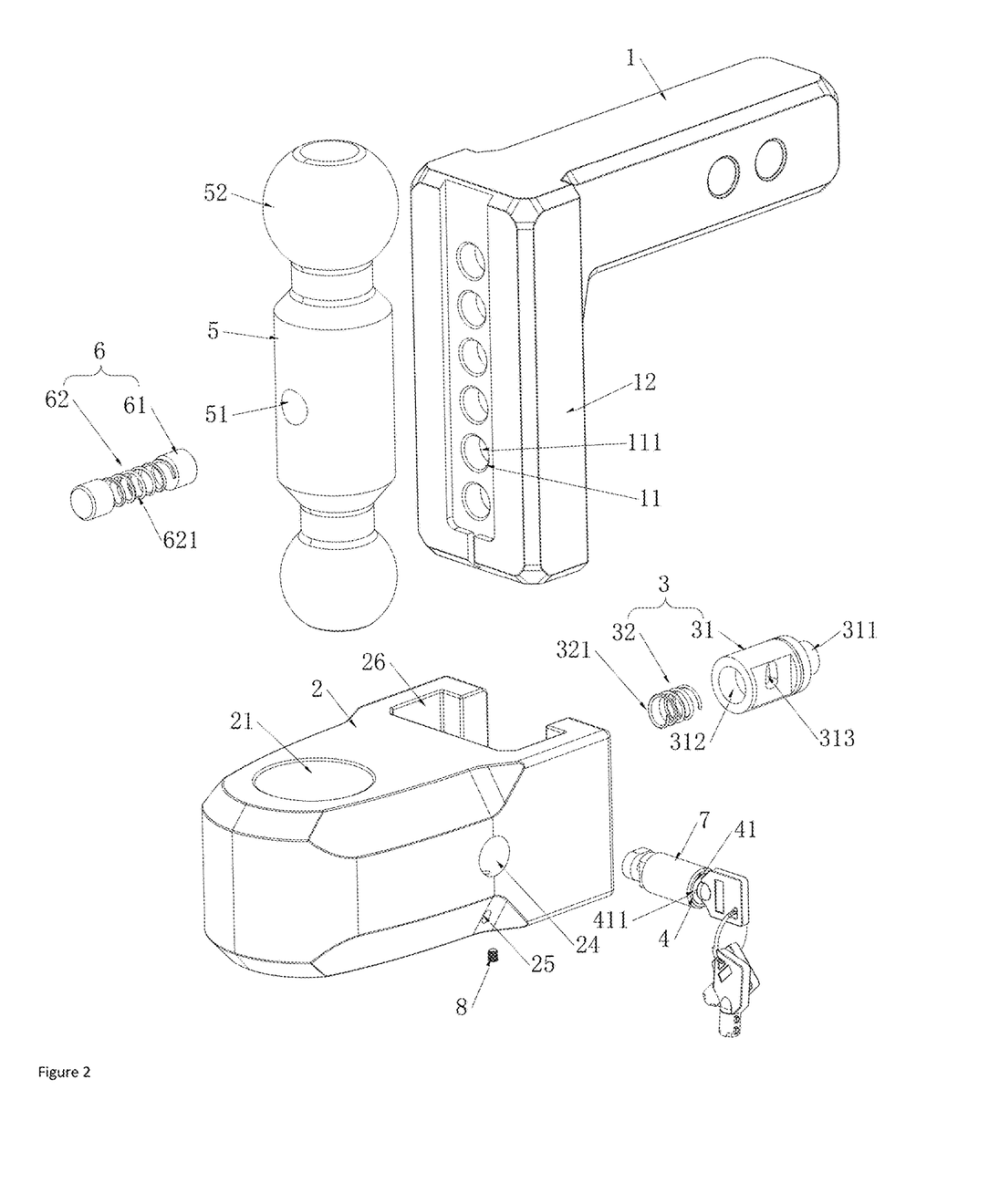
FIG. 2 is an exploded view of the adjustable ball-type trailer coupler according to the present invention.
Figure 3:
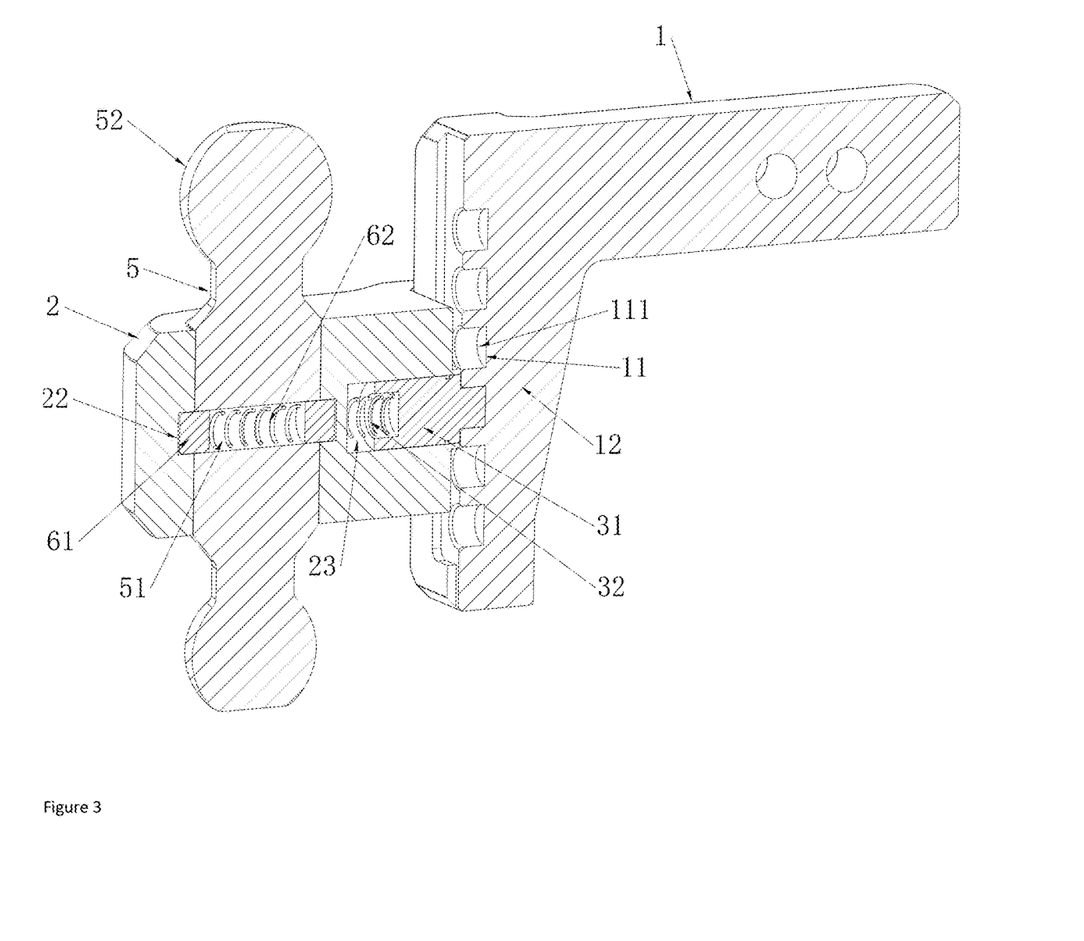
FIG. 3 is a sectional view of the adjustable ball-type trailer coupler according to the present invention from a second perspective.

Referring to FIGS. 2-3, in an implementation, the locking structure 3 includes:
 a locking shaft 31, the locking shaft 31 being arranged on the connecting base 2 in a transversely movable manner, the locking shaft 31 being provided with a second locking portion 311, and the second locking portion 311 fitting into the positioning portion 11. The second positioning portion 11 fits into the positioning portion 11 to reliably fix the connecting base 2 and the fixing base 1 together. Furthermore, the locking structure 3 of a shaft structure has a simple overall structure and a low processing difficulty, so that the cost can be reduced. Moreover, the mounting difficulty is lower, which is conductive to further improving the mounting efficiency.

Referring to FIGS. 2-3, in an implementation, the locking structure 3 further includes:
 a first elastic member 32, a first end of the first elastic member 32 being connected to the connecting base 2, a second end of the first elastic member 32 being connected to an end of the locking shaft 31 away from the second locking portion 311, and the first elastic member 32 being configured to drive the locking shaft 31 to switch from the unlocked state to the locked state. The provision of the first elastic member 32 provides elasticity to the locking shaft 31, and by means of the first elastic member 32, a thrust may be applied to the locking shaft 31 during switching from the unlocked state to the locked state, so that the locking of the locking shaft 31 is smoother, easier and more labor-saving, which thus can improve the ease of use.

Referring to FIG. 3, in an implementation, the connecting base 2 is provided with a guide hole 23 extending in a transverse direction of the connecting base, and the locking structure 3 is arranged in the guide hole 23 in a transversely movable manner to guide the movement of the locking structure 3, so that the locking structure 3 moves more stably and smoothly. Moreover, the area of contact between the connecting base 2 and the locking structure 3 can be increased by means of the fit between the guide hole 23 and the locking structure 3, so that the locking structure 3 and the connecting base 2 are more stable, achieving higher structural reliability.

Referring to FIGS. 2-3, in an implementation, a connecting slot 312 is provided in the end of the locking shaft 31 away from the second locking portion 311, the second end of the first elastic member 32 is inserted into the connecting slot 312, and the first end of the first elastic member 32 abuts against a bottom wall of the guide hole 23. In this way, by inserting the second end of the first elastic member 32 into the connecting slot 312 and making the first end of the first elastic member 32 abut against the bottom wall of the guide hole 23, the mounting of the first elastic member 32 can be completed, so that the mounting operation is simple and convenient, and the mounting efficiency can be further improved.

In other implementations, the first end of the first elastic member 32 abuts against the bottom wall of the guide hole 23, and the second end of the first elastic member 32 is welded to the end of the locking shaft 31 away from the second locking portion 311.

In an implementation, the first elastic member 32 is a first spring 321. The first elastic member 32 of a spring structure has better elastic property and structural stability, and can provide better elasticity to the locking shaft 31, which thus makes the locking of the locking shaft 31 smoother, easier and more labor-saving.

In other implementations, the first elastic member 32 may also be of a spring sheet structure or other elastic structures.

In an implementation, the unlocking structure 4 is rotated to drive the locking structure 3 to switch between the locked state and the unlocked state. In this way, locking and unlocking of the locking structure 3 can be realized by driving the unlocking structure 4 to rotate, which makes the operation more convenient.

Figure 4:
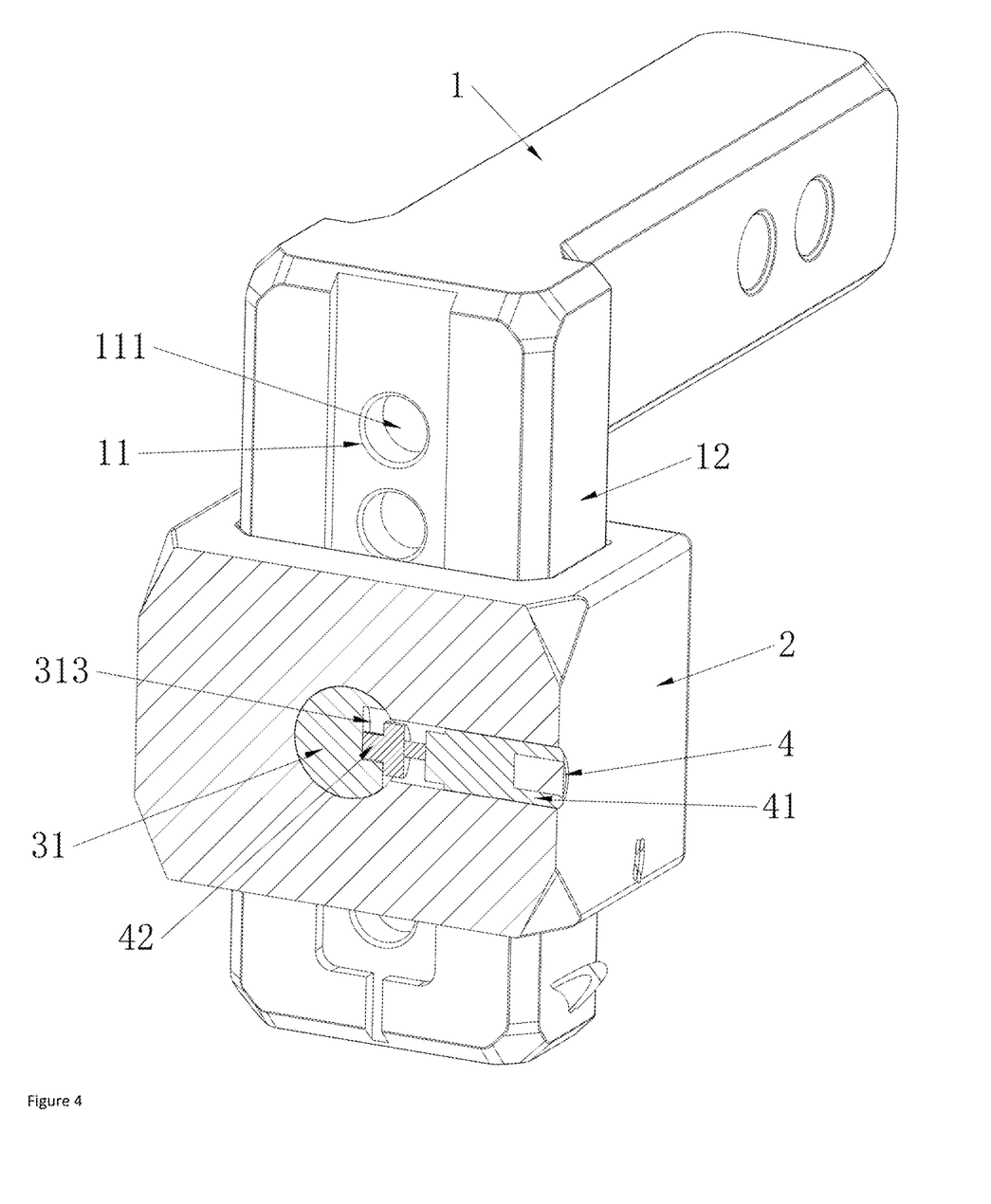
FIG. 4 is a sectional view of the adjustable ball-type trailer coupler according to the present invention from a third perspective.

Referring to FIGS. 2 and 4, in an implementation, the locking structure 3 is provided with a linkage slot 313, the linkage slot 313 being specifically arranged on an outer peripheral wall of the locking shaft 31; and
 the unlocking structure 4 is provided with a linkage portion 42, the linkage portion 42 being inserted into the linkage slot 313 and being capable of abutting against a slot wall of the linkage slot 313, and the linkage portion 42 being capable of rotating in the linkage slot 313 along with the rotation of the unlocking structure 4 to drive the locking structure 3 to move transversely. In this way, by driving the unlocking structure 4 to rotate, the linkage portion 42 can be driven to rotate in the linkage slot 313, and the linkage portion 42 abuts against the slot wall of the linkage slot 313 during rotation and thus can push the locking structure 3 to move transversely, so that the locking structure 3 can be driven to switch between the locked state and the unlocked state. Therefore, the structure is simple and practical, the cost is low, the mounting operation is simple and convenient, and the mounting efficiency can be further improved.

Referring to FIGS. 2 and 4, in an implementation, the unlocking structure 4 includes a lock cylinder 41, the lock cylinder 41 being rotatably arranged on the connecting base 2, the lock cylinder 41 being provided with an insertion hole 411, and the insertion hole 411 being configured for inserting fit with a key. In this way, the lock cylinder 41 can only be driven to rotate by inserting the key, and the lock cylinder 41 cannot be driven to rotate when the key is removed, thus greatly improving the safety and anti-theft performance.

Referring to FIG. 2, in an implementation, the adjustable trailer coupler further includes:
 a lock housing 7, the lock housing 7 being arranged on the connecting base 2, and the lock cylinder 41 being rotatably arranged in the lock housing 7. In this way, the lock cylinder 41 can be rotatably arranged on the connecting base 2 by fixing the lock housing 7 to the connecting base 2, so that the mounting operation is simple and convenient, and the mounting efficiency can be further improved.

Referring to FIG. 2, in an implementation, the connecting base 2 is provided with a mounting hole 24, and the lock housing 7 is embedded into the mounting hole 24, so that the lock housing 7 is reliably fixed to the connecting base 2, with a simple connecting structure and low cost.

Referring to FIG. 2, in an implementation, the connecting base 2 is also provided with a second connecting hole 25, the second connecting hole 25 is in communication with the mounting hole 24, the second connecting hole 25 is perpendicular to the mounting hole 24, and the second connecting hole 25 runs through an outer side wall of the connecting base 2; and
 the adjustable trailer coupler further includes:
 a fastener 8, the fastener 8 being screwed to the second connecting hole 25 and being connected to the lock housing 7, so that the lock housing 7 is reliably fixed to the connecting base 2, which provides a higher stability of connection, and thus can improve the structural stability.

In an implementation, the fastener 8 abuts against an outer side wall of the lock housing 7. In this way, during mounting, the fastener 8 is screwed to the second connecting hole 25 and abuts against the outer side wall of the lock housing 7, so that the lock housing 7 can be reliably fixed in the mounting hole 24. Therefore, the mounting operation is simpler and the mounting efficiency is higher.

In other implementations, a threaded hole is provided in the outer side wall of the lock housing 7, and is screwed to the fastener 8, and both of the lock housing 7 and the connecting base 2 are screwed to the fastener 8, thereby reliably fixing the lock housing 7 and the connecting base 2 together.

In an implementation, the fastener 8 is accommodated in the second connecting hole 25, so that the fastener 8 is hidden, which thus makes the appearance of the adjustable trailer coupler more concise and coherent and improves the aesthetic degree of appearance.

In other implementations, the unlocking structure 4 may include structures such as a knob or a toggle, the locking structure 3 can be driven to switch between the locked state and the unlocked state by rotating the knob, and the locking structure 3 can be driven to switch between the locked state and the unlocked state by driving the toggle to rotate or move.

Referring to FIGS. 2-3, in an implementation, the connector 5 is provided with a third connecting hole 51; and
 the elastic latching structure 6 further includes:
 a second elastic member 62, the second elastic member 62 being arranged in the third connecting hole 51, an end of the second elastic member 62 being connected to the first locking portion 61, and the second elastic member 62 being configured to drive the first locking portion 61 to switch from the avoidance state to the extension state. In this way, the first locking portion 61 can be retracted into the third connecting hole 51 by pressing the first locking portion 61 in a direction close to the third connecting hole 51, and the second elastic member 62 is also compressed to store potential energy, and the first locking portion 61 is released to enable the second elastic member 62 to release the potential energy so as to push the first locking portion 61 to extend out of the third connecting hole 51. The third connecting hole 51 is provided to guide the second elastic member 62 and the first locking portion 61, so that the second elastic member 62 and the first locking portion 61 can move more smoothly, achieving a simple and practical structure and high reliability.

In an implementation, the second elastic member 62 is a second spring 621. The second elastic member 62 of a spring structure has better elastic property and structural stability, and can provide better elasticity to the first locking portion 61, which thus makes the locking of the first locking portion 61 smoother, easier and more labor-saving.

In other implementations, the second elastic member 62 may be of a spring sheet structure or other elastic structures.

Referring to FIG. 3, in an implementation, the first connecting hole 21 is provided with the locking slots 22 on two opposite sides thereof; and
 the elastic latching structure 6 is provided with the first locking portions 61 on two ends thereof, and the first locking portions 61 fit into the locking slots 22 in a one-to-one correspondence, so that the stability of connection between the connector 5 and the connecting base 2 is improved, achieving higher structural stability.

In an implementation, there are two locking slots 22 and two first locking portions 61. In this way, when the connector 5 is mounted, the two first locking portions 61 arranged opposite to each other are pressed with one hand to retract the first locking portions 61 into the connector 5, and the connector 5 is then inserted into the first connecting hole 21, so that the mounting operation is simpler and more convenient.

In other implementations, the elastic latching structures 6 is provided with two or more first locking portions 61 on either end thereof.

In other implementations, the elastic latching structure 6 is provided with the first locking portion 61 on one end thereof, and the first locking portion 61 fitting into the locking slot 22 can also connect the connector 5 and the connecting base 2 together.

In an implementation, the cross section of the first locking portion 61 may be circular, square, triangular, irregular, etc.

Referring to FIGS. 1-4, in an implementation, ball ends 52 are provided on two ends of the connector 5, and the ball ends 52 at the two ends of the connector 5 have different outer diameters, so that the connector 5 can match the ball cover connecting arms of different types of towed devices, which provides a wider range of application and can improve the ease of use. Moreover, the appropriate dimension of the ball end 52 can be selected by independently turning the connector 5 or the connecting base 2 or the whole product up and down according to the needs of use.

In an implementation, one of the ball ends 52 at the two ends of the connector 5 has an outer diameter of 2 inches, and the other ball end 52 has an outer diameter of 2 5/16 inches. These two common dimensions can match the ball cover connecting arms of the most towed devices, thereby saving the use cost of purchasing multiple connectors 5 with a single structure, and eliminates the need to repeatedly replace and mount the connector 5 with a single structure. The convenient adjustability greatly improves the efficiency of use.

Referring to FIGS. 1-4, in an implementation, the connecting base 2 is provided with a guide slot 26, the guide slot 26 running up and down through the connecting base 2; and
    the fixing base 1 is provided with a guide portion 12, the guide portion 12 being slidably inserted into the guide slot 26, and the guide portion 12 being provided with the positioning portions 11. In this way, the guide portion 12 being inserted into the guide slot 26 and the locking structure 3 fitting into the positioning portion 11 can enables the connection between the fixing base 1 and the connecting base 2, so that the connecting operation is simple and convenient, and the connecting efficiency is high. Moreover, the area of contact between the connecting base 2 and the fixing base 1 can be increased by fitting the guide portion 12 into the guide slot 26, which thus can improve the reliability of connection between the connecting base 2 and the fixing base 1, achieving higher structural reliability. In addition, the guide portion 12 can slide in the guide slot 26 to move the connecting base 2 in height, so that the height of the connecting base 2 can be adjusted more smoothly and conveniently, and the convenience of adjustment is improved.

In other implementations, the guide slot 26 may be replaced with a hole structure.

In other implementations, a guide rail structure may also be used to replace a guide structure between the guide slot 26 and the guide portion 12.

In the description of this specification of the present disclosure, descriptions with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present disclosure, the meaning of "plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. An adjustable trailer coupler, comprising:
    a fixing base, the fixing base being configured for connection to a tractor, the fixing base being provided with a plurality of positioning portions, and the plurality of positioning portions being arranged in sequence in a height direction of the fixing base;
    a connecting base, the connecting base being arranged on the fixing base, the connecting base being movable in the height direction of the fixing base, the connecting base being provided with a first connecting hole and a locking slot, and the locking slot being located in a hole wall of the first connecting hole;
    a locking structure, the locking structure being arranged on the connecting base in a transversely movable manner, and the locking structure having a locked state in which the locking structure fits into any one of the positioning portions to limit the movement of the connecting base in the height direction of the fixing base and an unlocked state in which the locking structure is disengaged from the positioning portion to enable the movement of the connecting base in the height direction of the fixing base;
    an unlocking structure, the unlocking structure being movably arranged on the connecting base, the unlocking structure being connected to the locking structure, and the unlocking structure being forced to move to switch the locking structure between the locked state and the unlocked state;
    a connector, the connector being inserted into the first connecting hole, and the connector being configured for connection to a ball cover connecting arm of a towed device; and
    an elastic latching structure, the elastic latching structure being arranged on the connector, the elastic latching structure being provided with a first locking portion, the first locking portion fitting into the locking slot to limit disengagement of the connector from the first connecting hole, the first locking portion having an avoidance state of retracting into the connector to enable the movement of the connector along the first connecting hole and an extension state of extending out of the connector, and the first locking portion being reset from the avoidance state to the extension state under an elastic force of the elastic latching structure.

2. The adjustable trailer coupler according to claim 1, wherein the positioning portion comprises a positioning slot, the positioning slot being in inserting fit with the locking structure.

3. The adjustable trailer coupler according to claim 1, wherein the locking structure comprises:
    a locking shaft, the locking shaft being arranged on the connecting base in a transversely movable manner, the locking shaft being provided with a second locking portion, and the second locking portion fitting into the positioning portion.

4. The adjustable trailer coupler according to claim 3, wherein the locking structure further comprises:
    a first elastic member, a first end of the first elastic member being connected to the connecting base, a second end of the first elastic member being connected to an end of the locking shaft away from the second locking portion, and the first elastic member being configured to drive the locking shaft to switch from the unlocked state to the locked state.

5. The adjustable trailer coupler according to claim 4, wherein the connecting base is provided with a guide hole extending in a transverse direction of the connecting base, and the locking structure is arranged in the guide hole in a transversely movable manner.

6. The adjustable trailer coupler according to claim 5, wherein a connecting slot is provided in the end of the locking shaft away from the second locking portion, the second end of the first elastic member is inserted into the connecting slot, and the first end of the first elastic member abuts against a bottom wall of the guide hole.

7. The adjustable trailer coupler according to claim 4, wherein the first elastic member is a first spring.

8. The adjustable trailer coupler according to claim 1, wherein the unlocking structure is rotated to drive the locking structure to switch between the locked state and the unlocked state.

9. The adjustable trailer coupler according to claim 8, wherein the locking structure is provided with a linkage slot; and the unlocking structure is provided with a linkage portion, the linkage portion being inserted into the linkage slot and being capable of abutting against a slot wall of the linkage slot, and the linkage portion being capable of rotating in the linkage slot along with the rotation of the unlocking structure to drive the locking structure to move transversely.

10. The adjustable trailer coupler according to claim 1, wherein the unlocking structure comprises a lock cylinder, the lock cylinder being rotatably arranged on the connecting base, the lock cylinder being provided with an insertion hole, and the insertion hole being configured for inserting fit with a key.

11. The adjustable trailer coupler according to claim 10, further comprising:

a lock housing, the lock housing being arranged on the connecting base, and the lock cylinder being rotatably arranged in the lock housing.

12. The adjustable trailer coupler according to claim 11, wherein the connecting base is provided with a mounting hole, and the lock housing is embedded into the mounting hole.

13. The adjustable trailer coupler according to claim 12, wherein the connecting base is also provided with a second connecting hole, the second connecting hole is in communication with the mounting hole, the second connecting hole is perpendicular to the mounting hole, and the second connecting hole runs through an outer side wall of the connecting base; and the adjustable trailer coupler further comprises:

a fastener, the fastener being screwed to the second connecting hole and being connected to the lock housing.

14. The adjustable trailer coupler according to claim 13, wherein the fastener abuts against an outer side wall of the lock housing.

15. The adjustable trailer coupler according to claim 13, wherein the fastener is accommodated in the second connecting hole.

16. The adjustable trailer coupler according to claim 1, wherein the connector is provided with a third connecting hole; and the elastic latching structure further comprises:

a second elastic member, the second elastic member being arranged in the third connecting hole, an end of the second elastic member being connected to the first locking portion, and the second elastic member being configured to drive the first locking portion to switch from the avoidance state to the extension state.

17. The adjustable trailer coupler according to claim 1, wherein the first connecting hole is provided with the locking slots on two opposite sides thereof; and the elastic latching structure is provided with the first locking portions on two ends thereof, and the first locking portions fit into the locking slots in a one-to-one correspondence.

18. The adjustable trailer coupler according to claim 1, wherein ball ends are provided on two ends of the connector, and the ball ends at the two ends of the connector have different outer diameters.

19. The adjustable trailer coupler according to claim 18, wherein one of the ball ends at the two ends of the connector has an outer diameter of 2 inches, and the other ball end has an outer diameter of 2 5/16 inches.

20. The adjustable trailer coupler according to claim 1, wherein the connecting base is provided with a guide slot, the guide slot running up and down through the connecting base; and the fixing base is provided with a guide portion, the guide portion being slidably inserted into the guide slot, and the guide portion being provided with the positioning portions.

* * * * *